United States Patent Office 3,013,450
Patented Dec. 19, 1961

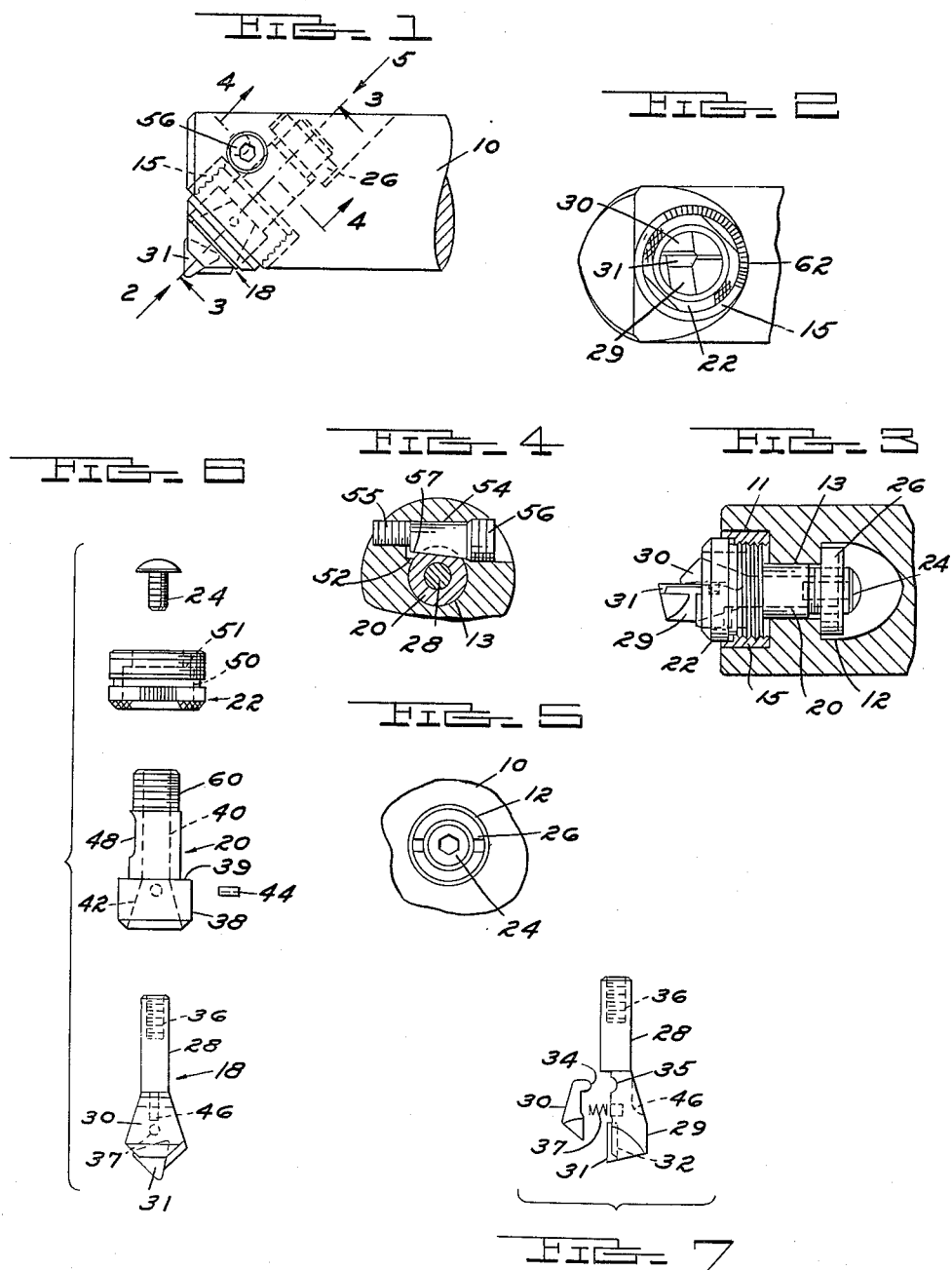

3,013,450
ADJUSTABLE TOOL INSERT FOR BORING
BARS AND THE LIKE
William Yogus, Birmingham, Mich., assignor to The
Valeron Corporation, Detroit, Mich., a corporation of
Michigan
Filed May 15, 1959, Ser. No. 813,470
4 Claims. (Cl. 77—58)

This invention relates to improved construction for an adjustable tool insert and particularly to improved tool carrying means therefor. The improved tool carrying means permit the use of a tool bit of the type having a plurality of cutting faces which can be used in succession.

Tool inserts of the present type are widely used, for example, in boring bars where a socket is provided in which the insert may be adjustably mounted so that the face of the cutting tool can be moved axially of the socket. Other holders are also employed to permit the use of inserts of this type in lathes and other machine tools.

Such tool inserts have commonly included tool carrying means in which a tool bit is mounted and which can be adjusted axially in a tool holder socket by manipulating a threaded adjusting member which engages the tool carrying means and socket at one end of the latter and by accompanying manipulation of a threaded locking member which engages the other end of the tool carrying means and socket.

In the present construction, one end of the socket is internally threaded, preferably by pressing a sleeve into a counterbored socket portion. This end of the socket is engaged by the threaded adjusting member which is in the form of a collar. The cutting or front end of the tool carrying means fits within this collar against an abutment surface thereon and extends through the collar and through the socket where its other end is engaged by the threaded locking member. The tool carrying means are held against rotation in the socket so that an axial adjustment can be obtained by manipulating the adjusting and locking members as mentioned above.

The improved tool carrying means consists of a tool cartridge member which has an enlarged head portion and a shank portion. A pair of jaws are provided on the head portion, a tool bit is positioned between them, and each jaw has an outer surface which tapers inwardly toward the shank portion of the cartridge. The cartridge fits into a cartridge barrel which has an internal bore to receive the cartridge shank portion and a tapered recess to receive the cartridge head portion. Means are provided for slidably and non-rotatably drawing the cartridge into the barrel so that the tapered jaw faces are forced into the tapered recess to clamp the tool bit firmly and securely in position. The cartridge barrel fits into the adjusting collar against a shoulder or abutment surface therein and extends through the collar into the socket of the tool holder where it is engaged by some suitable means to define slidable and non-rotatable relative movement between the tool cartridge barrel and socket. The locking member is also a collar which engages the rear or non-tool carrying end of the barrel.

Once the tool insert unit is mounted in the socket, the relation of the parts is such that the tool cartridge can be loosened and moved for changing or repositioning the multi-faced tool bit without disturbing the relative position of the other tool insert parts. Other features and advantages will be brought out in connection with the following description of the embodiment shown in the accompanying drawings which consist of the following views:

FIGURE 1, an elevation showing the tool insert installed in a socket provided in a boring bar;

FIGURE 2, a plan of the cutting or top end of the unit as shown by the arrow 2 on FIGURE 1;

FIGURE 3, a sectional elevation taken on the longitudinal center line of the unit as shown by the arrows 3—3 of FIGURE 1;

FIGURE 4, a transverse sectional elevation taken as shown by the arrows 4—4 of FIGURE 1;

FIGURE 5, a plan view of the bottom end of the unit as indicated by the arrow 5 in FIGURE 1;

FIGURE 6, an exploded view of the parts which comprise the tool carrying means; and FIGURE 7, a side elevation of the tool cartridge element shown in FIGURE 6.

The boring bar 10 or other form of tool holder is provided with a socket having a counterbored portion 11 at the top end, a counterbored portion 12 at the bottom end and an intermediate cylindrical portion 13 of smaller diameter. A sleeve 15 is pressed into the counterbored portion 11 or alternately this portion may be internally threaded.

The principal parts of the tool insert are best shown in FIGURES 6 and 7 and consist of a tool cartridge 18, a cartridge barrel 20, an adjusting collar 22, a tool bit clamp screw 24, and a locking collar 26 (FIG. 3).

Tool cartridge 18 has a cylindrical shank 28 formed integrally with a jaw 29, which together with a removable jaw 30, engage a tool bit 31. Tool bit 31 is positioned in a recess 32 in the jaw 29 and is preferably of the type which has a plurality of cutting faces which can be successively used. Removable jaw 30 has an arcuate pivot surface 34 which fits into a complementary formed notch 35 in the fixed jaw and the jaws are normally urged apart by a spring 37. The outer surface of both jaws is tapered inwardly toward the shank portion 28 of the cartridge. A tapered hole 36 extends into the shank portion 28 to receive the screw 24.

The tool cartridge barrel 20 has an enlarged top end 38 forming a shoulder 39 with the remaining portion of the barrel. The barrel is provided with an internal bore 40, the main portion of which is dimensioned to slidably receive the shank portion 28 of the tool cartridge and the remaining portion of which is formed with a tapered recess 42 complementary to the taper of the cartridge jaws 29 and 30. A pin or key 44 is fitted in the barrel so that its inner end projects inwardly into engagement with a slot or keyway 46 in the tool cartridge. The barrel 20 is also provided with a flat 48 along a portion of its surface.

With a tool bit 31 positioned in the recess 32 of the tool cartridge, the movable cartridge jaw 30 is positioned with its portion 34 in the notch 35 and the spring 37 is manually compressed an amount sufficient so that the cartridge shank 28 can be inserted within the bore 40 of the barrel with the pin 44 engaging the cartridge keyway 46. The tool cartridge clamp screw 24 is then threaded into engagement with the cartridge and tightened to draw the cartridge within the barrel until the tapered jaw surfaces are firmly seated in the tapered recess 42. This pivots the movable jaw 30 on its surface 34 and securely locks the tool bit 31 in position.

The adjusting collar 22 is formed with a counterbored portion 50 to receive the head 38 of the cartridge barrel and to form a surface 51 against which the barrel shoulder 39 may abut.

The socket construction includes a hole 52 (FIG. 4) formed transversely at one side of the longitudinal axis of the main socket portion 13. A wedge member 54 is mounted in this hole and positioned longitudinally therein by a pair of adjusting screws 55 and 56. The wedge surface 57 of the member 54 is adapted to engage a portion of the length of the flat surface 48 of the cartridge barrel 20.

With the tool carrying means consisting of the tool bit 31, cartridge 18, barrel 20, and clamp screw 24, assembled as previously outlined, the unit is mounted in the bar by first loosening the wedge adjusting screw 56 so that the wedge member 54 may be moved out of interfering relation with the socket portion 13. The cartridge barrel 20 is positioned in the adjusting collar 22 and inserted in the socket by threading the collar 22 into the sleeve 15. Wedge member 54 is then brought into snug but not clamping engagement with the flat 48 of the barrel so that the barrel may move slidably or axially in the socket but not rotatably therein. The adjusting collar 22 is then turned to establish the desired position for the tool longitudinally of the socket and the tool insert is locked in this position by threading the lock collar 26 onto the threaded bottom end portion 60 of the barrel.

This adjustment is facilitated by suitable graduations 62 provided on the top end of the sleeve 15. With the aid of these graduations the tool bit may be accurately adjusted to the work as desired.

When the tool bit 31 becomes worn, it can easily be removed and either turned so that a new cutting face is presented, or replaced. Tool bit clamp screw 24 is always accessible from the bottom end of the unit and when loosened, a sufficient relative movement can be obtained between the jaws 30 and 29 to permit the tool bit 31 to be replaced in its recess 32. When the clamping screw is retightened, operations can proceed usually without the necessity of resetting the adjusting collar 22 and locking collar 26 since the position of the unit as a whole has not been disturbed in its socket.

While preferred embodiments have been described above in detail, it will be understood that numerous modifications might be resorted to without departing from the scope of the invention as defined in the following claims.

I claim:

1. An adjustable tool insert for a tool holder socket provided with a threaded portion at one end thereof comprising, an adjusting collar having threads for engagement with said threaded portion, a tool cartridge having a pair of relatively movable jaws, said jaws each having a tapered outer surface, a tool bit removably mounted between said jaws, a cartridge barrel having an internal bore terminating at one end in a tapered recess corresponding to said tapered jaw surfaces, said tool cartridge having a shank extending into said bore, key means for slidably and non-rotatably positioning said cartridge in said barrel, a screw engaging said shank and abutting against the other end of said barrel to draw said cartridge into said barrel, seating the tapered jaw surfaces in said barrel recess and thereby clamping said tool bit firmly between said jaws, an abutment surface provided adjacent the said recessed end of said barrel for engagement with a complementary abutment surface formed within said adjusting collar, an externally threaded portion formed on the other end of said barrel, a lock nut engageable with said barrel threaded portion and with a surface formed on said tool holder to draw said abutment surfaces together, and means for preventing rotation of said barrel in said socket whereby said barrel and tool cartridge can be adjusted longitudinally thereof by loosening said lock nut, turning said adjusting collar, and retightening said lock nut.

2. A tool insert of the type having tool carrying means adjustable in a tool holder socket by manipulation of a threaded adjusting member at one end of said tool carrying means and a threaded locking member at the other end thereof, characterized by said tool carrying means comprising a tool cartridge having a shank portion and an enlarged head portion, said head portion including a pair of relatively movable jaws each having an outer surface tapering inwardly toward said shank portion, a tool bit of the type having a plurality of successively useable cutting faces mounted between said tool cartridge jaws, one of said jaws being provided with a recess having at least a pair of faces engageable by an adjacent pair of faces of said tool bit, a cartridge barrel having an internal bore to slidably receive said shank portion, said bore having a tapered recess at one end thereof to receive said head portion, means for slidably and non-rotatably drawing said cartridge into said barrel to engage said jaws in said tapered recess and clamp said tool bit in said tool cartridge recess, means for slidably and non-rotatably mounting said barrel in said tool holder socket, said threaded adjusting member including an abutment surface engageable by said barrel, and said threaded locking member engaging said barrel to draw it into engagement with said abutment surface.

3. An adjustable tool insert for a tool holder socket provided with a threaded portion at one end thereof comprising, an adjusting collar having threads for engagement with said threaded portion, a tool cartridge, a tool bit carried by said tool cartridge, a cartridge barrel having an internal bore, said tool cartridge having a shank extending into said bore, key means for slidably and non-rotatably positioning said cartridge in said barrel, means for removably securing said cartridge in said barrel, an abutment surface provided adjacent one end of said barrel for engagement with a complementary abutment surface formed within said adjusting collar, an externally threaded portion formed on the other end of said barrel, a lock nut engageable with said barrel threaded portion and with a surface formed on said tool holder to draw said abutment surfaces together, and means for preventing rotation of said barrel in said socket whereby said barrel and tool cartridge can be adjusted longitudinally thereof by loosening said lock nut, turning said adjusting collar, and retightening said lock nut.

4. A tool insert of the type having tool carrying means adjustable in a tool holder socket by manipulation of a threaded adjusting member at one end of said tool carrying means and a threaded locking member at the other end thereof, characterized by said tool carrying means comprising a tool cartridge having a shank portion and an enlarged head portion, said head portion including a pair of relatively movable jaws each having an outer surface tapering inwardly toward said shank portion, a cartridge barrel having an internal bore to slidably receive said shank portion, said bore having a tapered recess at one end thereof to receive said head portion, a tool bit positioned between said jaws, means for slidably and non-rotatably drawing said cartridge into said barrel to engage said jaws in said tapered recess and clamp said tool bit between said jaws, said threaded adjusting member comprising a collar threadedly engaging said tool holder at one end of said socket, said collar having an internal annular adjustment surface engageable by an abutment shoulder formed on said barrel.

References Cited in the file of this patent

UNITED STATES PATENTS

| 241,705 | Ober | May 17, 1881 |
| 2,253,028 | Hassig | Aug. 19, 1941 |
| 2,524,374 | Briney | Oct. 3, 1950 |
| 2,629,270 | Kaehlert | Feb. 24, 1953 |

FOREIGN PATENTS

| 619,549 | Great Britain | Mar. 10, 1949 |
| 685,039 | Great Britain | Dec. 31, 1952 |
| 935,770 | France | Feb. 9, 1948 |